United States Patent
Aher et al.

(10) Patent No.: US 12,112,758 B2
(45) Date of Patent: Oct. 8, 2024

(54) SYSTEMS AND METHODS FOR DETERMINING TRAITS BASED ON VOICE ANALYSIS

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/203,214

(22) Filed: May 30, 2023

(65) Prior Publication Data

US 2023/0306969 A1 Sep. 28, 2023

Related U.S. Application Data

(63) Continuation of application No. 16/908,132, filed on Jun. 22, 2020, now Pat. No. 11,699,447.

(51) Int. Cl.
*G10L 17/06* (2013.01)
*G10L 17/04* (2013.01)
*G10L 17/18* (2013.01)
*G10L 17/26* (2013.01)

(52) U.S. Cl.
CPC .............. *G10L 17/06* (2013.01); *G10L 17/04* (2013.01); *G10L 17/18* (2013.01); *G10L 17/26* (2013.01)

(58) Field of Classification Search
CPC ......... G10L 17/06; G10L 17/04; G10L 17/18; G10L 17/26
USPC ....................................................... 704/246
See application file for complete search history.

(56) References Cited

U.S. PATENT DOCUMENTS

| | | | |
|---|---|---|---|
| 6,424,946 B1 * | 7/2002 | Tritschler | G10L 15/26 707/E17.058 |
| 8,831,942 B1 * | 9/2014 | Nucci | G10L 25/90 704/250 |
| 10,127,911 B2 * | 11/2018 | Kim | G10L 17/06 |
| 10,347,244 B2 * | 7/2019 | Goel | G10L 15/26 |
| 10,650,824 B1 * | 5/2020 | Kesharaju | G10L 17/00 |
| 11,282,385 B2 * | 3/2022 | Lewis | G01C 21/3453 |

(Continued)

OTHER PUBLICATIONS

What is the Azure Speaker Recognition service? Azure Cognitive Services, Microsoft Docs, https://docs.microsoft.com/en-in/azure/cognitive-services/speaker-recognition/home#identification , May 27, 2020 (5 pages).

(Continued)

*Primary Examiner* — Edwin S Leland, III
(74) *Attorney, Agent, or Firm* — Haley Guiliano LLP

(57) ABSTRACT

Systems and methods are provided herein for determining one or more traits of a speaker based on voice analysis to present content item to the speaker. In one example, the method receives a voice query and determines whether the voice query matches within a first confidence threshold of a speaker identification (ID) among a plurality of speaker IDs stored in a speaker profile. In response to determining that the voice query matches to the speaker ID within the first confidence threshold, the method bypasses a trait prediction engine and retrieves a trait among the plurality of traits in the speaker profile associated with the matched speaker ID. The method further provides a content item based on the retrieved trait.

20 Claims, 6 Drawing Sheets

(56) References Cited

U.S. PATENT DOCUMENTS

| | | | |
|---|---|---|---|
| 11,699,447 B2* | 7/2023 | Aher | G10L 17/06 704/246 |
| 2007/0061413 A1* | 3/2007 | Larsen | H04L 63/0861 709/217 |
| 2010/0105484 A1* | 4/2010 | Horneff | A63F 13/79 463/43 |
| 2016/0035346 A1* | 2/2016 | Chengalvarayan | G10L 15/07 704/246 |
| 2017/0301353 A1* | 10/2017 | Mozer | G10L 17/02 |
| 2018/0226079 A1* | 8/2018 | Khoury | G06F 21/32 |
| 2019/0362724 A1* | 11/2019 | Wang | G10L 17/22 |
| 2021/0027789 A1* | 1/2021 | Grancharov | G10L 17/06 |
| 2021/0264939 A1* | 8/2021 | Yamamoto | A61B 5/7257 |
| 2021/0281965 A1* | 9/2021 | Malik | H04R 3/005 |
| 2021/0326421 A1* | 10/2021 | Khoury | G10L 17/08 |
| 2021/0398541 A1* | 12/2021 | Aher | G10L 17/06 |
| 2021/0407523 A1* | 12/2021 | Perero Codosero | G10L 15/02 |
| 2022/0199091 A1* | 6/2022 | Kanda | G10L 19/022 |
| 2023/0306969 A1* | 9/2023 | Aher | G10L 17/18 |

OTHER PUBLICATIONS

Anand et al., "Few shot speaker recognition using deep neural networks," https://www.groundai.com/project/few-shot-speaker-recognition-using-deep-neural-networks/1, Apr. 17, 2019 (9 pages).

* cited by examiner

200

- 202 Audio Processing Circuitry
- 204 Control Circuitry
- 206 ID Prediction Engine
- 208 Trait Prediction Engine
- 210 Database

FIG. 2

SYSTEMS AND METHODS FOR DETERMINING TRAITS BASED ON VOICE ANALYSIS

CROSS-REFERENCE TO RELATED APPLICATIONS

This application is a continuation of U.S. patent application Ser. No. 16/908,132, filed Jun. 22, 2020, which is hereby incorporated by reference herein in its entirety.

BACKGROUND

The present disclosure is directed to systems and methods for determining one or more traits of a speaker based on voice analysis to present content to the speaker. In particular, systems and methods are provided for either bypassing trait prediction or invoking the trait prediction based on confidence level in identity of the speaker determined from the voice analysis.

SUMMARY

Voice analysis applications use biometric fingerprints to uniquely identify voice for natural language understanding (NLU) to address use cases such as determining authentication of a speaker, providing content personalized to the speaker. Such applications analyze audio signals of a speaker to invoke a set of application programming interfaces, each of which performs predictions such as identification and traits such as age and gender of the speaker. Conventionally, these predictions are performed by having an ensemble model approach, which may result in inaccuracy of the predictions. Such an ensemble model approach utilizes a supervised learning technique by creating multiple sub-system models to predict the identification and traits of a speaker by using different training data sets. Typically, audio features of a speaker are analyzed to either simultaneously predict traits and identification of the speaker or predict traits before the identification. Thus, sub-system modules are invoked every time during training and during live trait predictions of the speaker, which are both expensive and time-consuming operations.

To solve these problems, systems and methods are provided herein for bypassing one or more sub-systems to predict traits of the speaker. To accomplish this, the system relies on the identity of the speaker to be predicted with a certain confidence level. Upon this identity prediction, one or more traits of the identified speaker are retrieved from an already determined trait profile. Thus, a trait prediction sub-system is invoked only when the identity of the speaker is not predicted with the certain confidence level. Additionally, identity of the speaker is determined without utilizing trait(s) at the time of training and prediction.

In some embodiments, a voice query is received from a speaker. If the system determines that the speaker is identified with a certain confidence level, then a trait associated with the identified speaker is retrieved from a profile and sent to the NLU. However, if the speaker is not identified with the certain confidence level, then a trait prediction engine is invoked to determine trait of the speaker while dynamically creating a new ID for the speaker. For example, a profile is already created for a certain number of members living in a household such that if the speaker is the member then the trait of a member can be retrieved from the profile. However, if the speaker is a guest visiting the household and a profile does not exist for the guest, then the trait prediction engine is invoked to determine the trait of the guest and creates a new ID for the guest.

In some embodiments, ID prediction and trait engine(s) are trained to predict the ID and one or more traits of the speaker. Such training includes processing features of various types of the audio signals of the same speaker to correlate both with the ID and the one or more traits corresponding to the ID. For example, speech features (pitch, frequency, etc.) are utilized to train the ID prediction engines to identify the speaker and to train the trait engine to predict the trait of the speaker. In one embodiment, the trait engine(s) are updated/trained based on the confidence level of the ID prediction engine. For example, if the ID prediction engine predicts the ID of a speaker with a higher confidence level than before, then the trait engine(s) are updated by implying same audio of the speaker.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 2 shows a block diagram of an illustrative example of a system for determining trait(s) based on voice analysis, in accordance with some embodiments of the disclosure;

DETAILED DESCRIPTION

Figure 1:
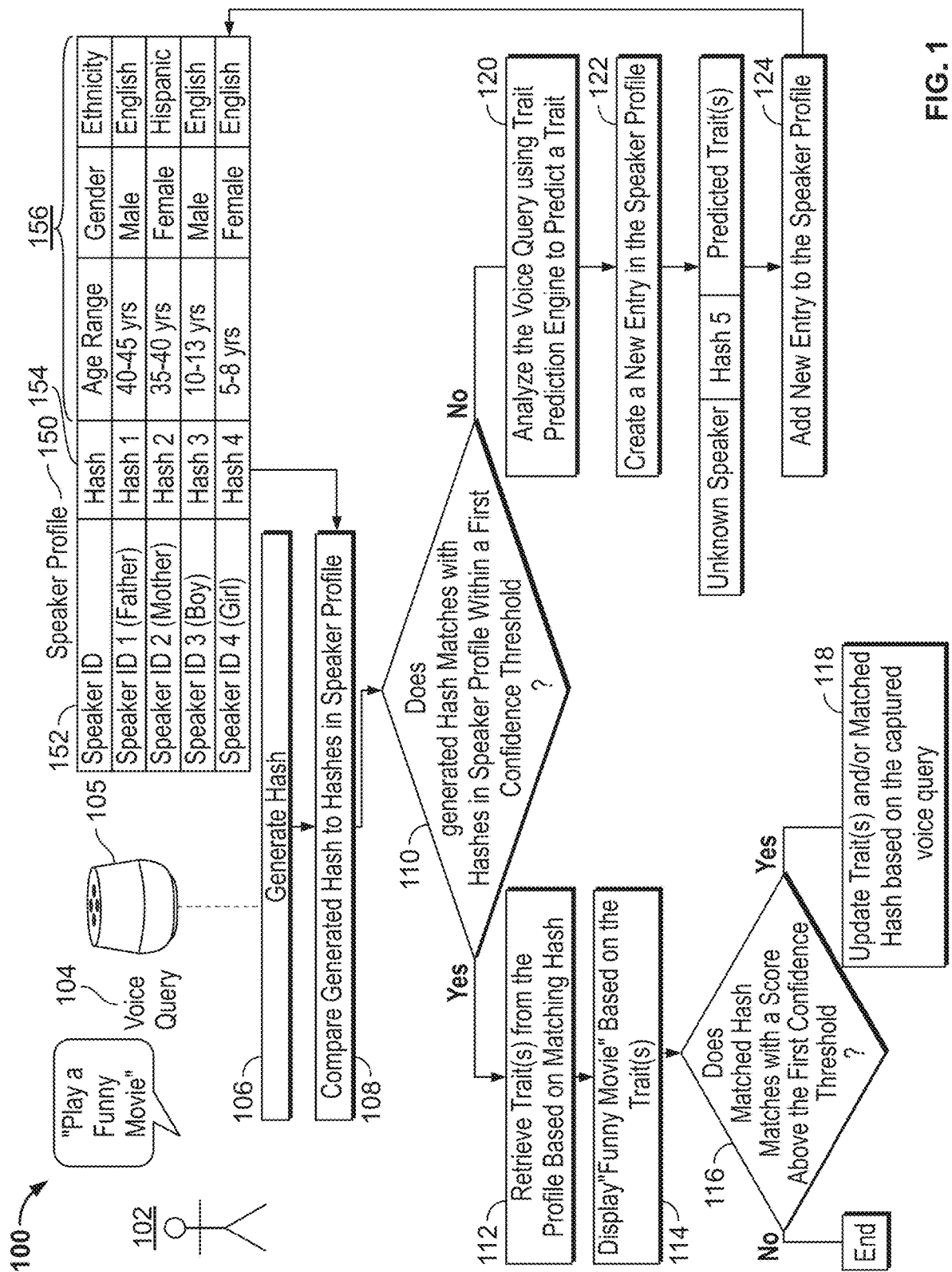
FIG. 1 shows an illustrative example of determining trait(s) based on voice analysis to provide content item, in accordance with some embodiments of the disclosure.

Methods and systems are described herein for determining trait(s) of a speaker based on voice analysis and providing content item based on the determined trait(s). In some embodiments, a trait determination application determines whether a voice query matches within a confidence threshold of a speaker identification (ID) among a plurality of speaker IDs stored in a speaker profile. The speaker profile comprises data including a plurality of unique speaker IDs, a biometric fingerprint (hash) corresponding to each of the speaker IDs and one or more traits corresponding to each of the speaker IDs. In one example, the speaker profile provides data of members of a household. In one embodiment, the method generates a hash from the voice query and compares it with a hash corresponding to each of the speaker IDs to determine whether there is a match within a confidence threshold. In one embodiment, the confidence threshold is predetermined based on the speech features previously captured from the voice query. The confidence threshold is used as a standard to analyze voice quality of the voice captured in real time. In one embodiment, the method determines a match and bypasses a trait prediction engine. The method retrieves one or more traits corresponding to the speaker profile corresponding to the matched speaker ID and provides a content item based on the retrieved trait(s). In one embodiment, the content item is provided based on the trait(s) corresponding with the matched speaker ID. In one example, the voice query is from a father of the household, and the content item is an adult-rated content item. In one example, the voice query is from a child, and the content item is a child-rated content item. In one embodiment, the method does not determine a match within the confidence threshold. In one example, the voice query is from a guest visiting the household. The method invokes the trait prediction engine to predict a trait of the voice query that did not match within the confidence threshold while dynamically generating a new speaker ID for the voice query. The method creates a new entry in the speaker profile with the newly generated speaker ID and the corresponding predicted trait.

As referred to herein, the "content item" should be understood to mean electronically consumable assets, such as online games, virtual, augmented or mixed reality content, direct-to-consumer live streams (such as those provided by Twitch, for example), VR chat applications, VR video players, 360 video content, television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In various embodiments described herein, "trait determination application" is an application that leverages acoustic features of a voice query to determine trait of the speaker and provide content item based on the trait to present to the speaker. In some embodiments, the trait determination application may be provided as an on-line application (i.e., provided on a website), or as a stand-alone application on a server, user device, etc. Various devices and platforms that may implement the trait determination application are described in more detail below. In some embodiments, the trait determination application, and/or any instructions for performing any of the embodiments discussed herein may be encoded on computer-readable media. Computer-readable media includes any capable of storing instructions and/or data. The computer-readable may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, card, register memory, processor caches, Random Access Memory ("RAM"), etc.

FIG. 1 shows an illustrative example of a flow of operations of a trait determination application performed by, e.g., control circuitry 406 (FIG. 4) for determining a trait of a speaker in accordance with some embodiments of the present disclosure. In particular, FIG. 1 shows a scenario 100 where a voice query 104 (e.g., query "Play a Funny Movie") is received via user input/output device 105 (e.g., digital voice assistant). In some embodiments, the query is received as voice input from a speaker 102.

At block 106, a hash (hash value) is generated based on a voice query. In one embodiment, a hash is a biometric fingerprint generated (e.g., audio processing 402 in FIG. 4) from the voice query. At block 108, the trait determination application compares the generated hash to hashes in a speaker profile. As shown, in one example, a speaker profile 150 is a data structure such as a table, including Speaker ID 152, a hash 154 corresponding to the Speaker ID 152 and traits 156 in the figure (e.g., age range, gender, ethnicity) corresponding to the Speaker ID 152. In one example, the speaker profile 150 is a profile of members living in a household such as father, mother, boy and girl. Based on the comparison, at block 110, the trait determination application determines whether the generated hash matches with at least one hash among the hashes in the speaker profile 150 within a first confidence threshold. In one embodiment, the first confidence threshold is pre-determined based on the voice previously captured from the voice query. The first confidence threshold is used as a standard to analyze voice quality of the voice captured in real time. In one example, the first confidence threshold is in the range of 70 percent to 80 percent. In one example, the generated match matches with Hash 1 within the range of 70 percent to 80 percent. In one embodiment, at block 112, the trait determination application retrieves trait(s) from the speaker profile based on the matching hash at block 110. In one example, the matched hash is Hash 1. Thus, it is determined that the speaker 102 is an English male in the age range of 40-45 yrs. At block 114, the trait determination application displays "Funny Movie" based on the retrieved trait(s). At block 116, the trait determination application determines whether the matched hash matches with a score above the first confidence threshold. In one example, it is determined whether the generated hash that matched with Hash 1 was matched with a 90 percent score, which is higher than the range of 70 percent to 80 percent of the first confidence threshold. Thus, biometric fingerprint of the voice captured from the voice query is determined to be of a higher quality. In one example, it is determined from the biometric fingerprint of the higher quality that the ethnicity is Hispanic. At block 118, the trait determination application updates the trait(s) and/or matched hash based on the voice query. In one example, Hash 1 is replaced with the generated hash in the speaker profile 150. In one example, the ethnicity of English of Speaker ID 1 is replaced with Hispanic in the speaker profile 150. In one embodiment, the trait determination application determines a trait to be updated based on a trait threshold. In one embodiment, the trait threshold is pre-determined based on the trait previously determined from the voice query. The trait threshold is used as a standard to analyze accuracy of the trait determined from the voice query captured in real time. In one example, the trait is the age range and the trait threshold is an age range of 40-50 years. For example, it is determined from the biometric fingerprint of the higher quality that the age range is 51-55 years, which does not fall within the trait threshold. In one example, the age range of 40-45 years of Speaker ID 1 is replaced with 51-55 years in the speaker profile 150. In another example, both the ethnicity of English of the Speaker ID 1 is replaced with Hispanic and the age range of 40-45 years of the Speaker ID is replaced with 50-55 years in the speaker profile 150.

Returning back to block 110, when it is determined that the generated hash does not match with any hash among the hashes in speaker profile 150 within the first confidence threshold, the trait determination application analyzes the voice query using a trait prediction engine (e.g., 206 in FIG. 2) to predict the trait at block 112. In one example, it is determined that the generated hash does not match any of the hashes 154 in the speaker profile 150 within the range of 70 to 80 percent. In one example, the speaker 102 is an elderly 80-year-old female guest (e.g., "Grandma") visiting the household. As such, the speaker 102 is an unknown speaker. At block 122, the trait determination application creates a new entry in the speaker profile. In one example, the new entry includes the unknown speaker as speaker ID, hash 5 and predicted traits such as age range of 75-90-year-old female of Spanish ethnicity. At block 124, the trait determination application adds this new entry to the speaker profile 150.

FIG. 2 illustrates an example of an exemplary system 200 for determining traits based on voice analysis. In some embodiments, the system includes an audio processing circuitry 202, a control circuitry 204, an identification (ID) prediction engine 206, a trait prediction engine 208 and a database 210. The audio processing circuitry 202 performs the voice processing application by utilizing acoustic features extracted from audio of the voice query (e.g., 102) to identify the speaker.

In some embodiments, the audio processing circuitry 202 performs a voice processing application such as automatic speech recognition (ASR) by utilizing acoustic features extracted from audio of the voice query. In some embodiments, the voice processing application compares acoustic features of raw audio from the voice query with previously determined acoustic features to determine whether there is a match. In some embodiments, the voice processing application may generate a biometric fingerprint uniquely identifying the voice of the speaker. For example, the voice processing application may identify unique characteristics or features of the voice of the speaker (e.g., tone, pitch, pace, etc.) and may store in a data structure a value for each of those features that are unique to the speaker. For example, the voice processing application may determine a unique pitch value, tone value and pace associated with the speaking of the speaker and may store those values in a profile of the speaker. In one embodiment, the voice processing application may generate a biometric fingerprint for the voice input (e.g., by analyzing the features of the voice input). In one embodiment, the voice processing application may generate the biometric fingerprint for each speaker of a plurality of speakers (e.g., plurality of speakers having access to input/output device 105). For example, the voice processing application may generate a biometric fingerprint for the voice input (e.g., by analyzing the features of the voice input as discussed above). In one embodiment, the biometric fingerprint is a hash value (e.g., hash 154 of FIG. 1) stored in the speaker profile 150.

In one embodiment, the control circuitry 204 performs the trait determination application by comparing features in the generated biometric fingerprint of the voice input to the features of each biometric fingerprint of the plurality of biometric fingerprints to find a match. In some embodiments, the trait determination application may compare the generated biometric fingerprint to a plurality of biometric fingerprints stored in the database 210 (e.g. speaker profile 150), wherein each biometric fingerprint in the database is associated with a unique speaker identification (ID) (e.g. Speaker ID 142 of FIG. 1) among a plurality of speaker IDs stored in the database 210. In one embodiment, the trait determination application determines that the generated biometric fingerprints matches with at least one fingerprint stored in the database 210 within a first confidence threshold and thus bypasses the ID prediction engine 206 and trait prediction engine 208 and retrieves trait of the speaker from the database 210 corresponding to the matched fingerprint.

In one embodiment, the trait determination application determines that the generated biometric fingerprint does not match the stored fingerprint within the first confidence threshold and thus triggers the ID prediction engine 206 and the trait prediction engine 208. In one embodiment, the ID prediction engine 206 predicts a new speaker ID based on the generated biometric fingerprint that does not match with the stored fingerprint within the first confidence threshold. In one embodiment, the ID prediction engine 206 is trained to predict the new speaker ID based on the biometric fingerprints generated from the voice query.

In one embodiment, the ID prediction engine 206 is trained using audio signals from the voice query. In one embodiment, a plurality of characteristics or features of audio signals from a voice (e.g., tone, pitch, pace, etc.) are provided to a gated recurrent unit (GRU). In one embodiment, the GRU extracts significant features at an utterance level. In one embodiment, the GRU is a subset of long short-term memory (LSTM) where it has a forget gate to selectively choose significant features among the plurality of features. In one embodiment, the GRU utilizes computing principal component analysis (PCA) to apply a signal or vector technique to extract the most variant features from a specific signal (or vector) and same across all the signals across a within class set. In one embodiment, the extracted most variant features are fed into a convolutional neural network (CNN). In one embodiment, a tag is used as a speaker ID among the plurality of speakers (e.g. members) within an area (e.g. household). In one embodiment, tags are encoded using basic encoding before feeding into an ID prediction model. In one embodiment, the ID prediction model is trained on a fair training set for each speaker and the system may use suitable loss functions such as subspace loss, or a triplet loss function for example, residual CNN. Additional details of utilizing the CNN for training data for speaker recognition are provided in https://www.groundai.com/project/few-shot-speaker-recognition-using-deep-neural-networks/1, which is incorporated by reference herein in its entirety.

In one embodiment, an output of the ID prediction model is an ID of the speaker which is predicted with a confidence level within a confidence threshold. Additional details of confidence level in speaker identification to identify a speaker is provided in US Patent Publication No. 2017/0301353A, which is incorporated by reference herein in its entirety, and in https://docs.microsoft.com/en-in/azure/cognitive-services/speaker-recognition/home #identification, which is also incorporated by reference herein in its entirety. In one embodiment, the speaker ID of the speaker within the area is used as a perceptual hash function in order to pinout the speaker (e.g. member) within the area (e.g. household) and further predict traits of the speaker by using the predicted speaker ID.

In one embodiment, the trait prediction engine 208 predicts a new trait for the generated fingerprint that do not match with the stored fingerprint within the first confidence threshold. In one embodiment, the trait prediction engine 208 is trained to predict the new trait based on the biometric fingerprint generated from the voice query and the new speaker ID. In one embodiment, the trait prediction engine 208 is trained using the audio signals similarly as discussed above with respect to training the ID prediction engine 206. In one embodiment, the traits are predicted using the speaker ID determined by the ID prediction engine 206. In one embodiment, a tag is used as a trait among a plurality of traits. In one embodiment, tags are encoded using basic encoding before feeding into a trait prediction model. In one embodiment, the trait prediction model is trained on a fair training set for each speaker and the system may use suitable loss functions such as subspace loss, or a triplet loss function in case of a residual CNN. An output of the trait prediction model is a trait of the speaker which is predicted within a confidence level of trait threshold. Additional details of training data to identify a speaker as male or female are provided in U.S. Pat. No. 6,424,946B1, which is incorporated by reference herein in its entirety. In one embodiment, the trait determination application stores the new speaker ID, the generated fingerprint and the newly predicted trait corresponding to the new speaker ID in the database 210.

In one embodiment, the trait determination application determines that the generated fingerprint that matched with a stored fingerprint has a score higher than the first confidence threshold. In one embodiment, the trait determination application updates the matched biometric fingerprint with the generated biometric fingerprint from the voice query in the database 210. For example, the trait determination application replaces the matched biometric fingerprint with the generated biometric fingerprint in the database 210. In one embodiment, the trait determination application triggers the trait prediction engine 208 to update the trait based on the generated biometric fingerprint from the voice query. In one embodiment, the trait determination application determines a trait to be updated based on the trait threshold. As discussed above, in one embodiment, the trait threshold is pre-determined based on the trait previously determined from the voice query. The trait threshold is used as a standard to analyze accuracy of the trait determined from the voice query captured in real time. In one embodiment, the trait determination application determines that the generated biometric fingerprint from the voice query does not fall within the trait threshold. In one embodiment, the trait prediction engine 208 is trained to predict the updated trait based on the biometric fingerprint generated from the voice query.

Although only one trait prediction engine 208 is shown to predict and/or update trait(s), it is known to one of ordinary skill in the art that a plurality of trait prediction engines may be used to separately predict and/or update traits such as age, gender, ethnicity, race, behavior, emotions, etc. In one embodiment, the trait prediction engine among the plurality of trait prediction engines in which the predicted trait is less than the trait threshold is triggered to update the predicted trait.

Figure 3:
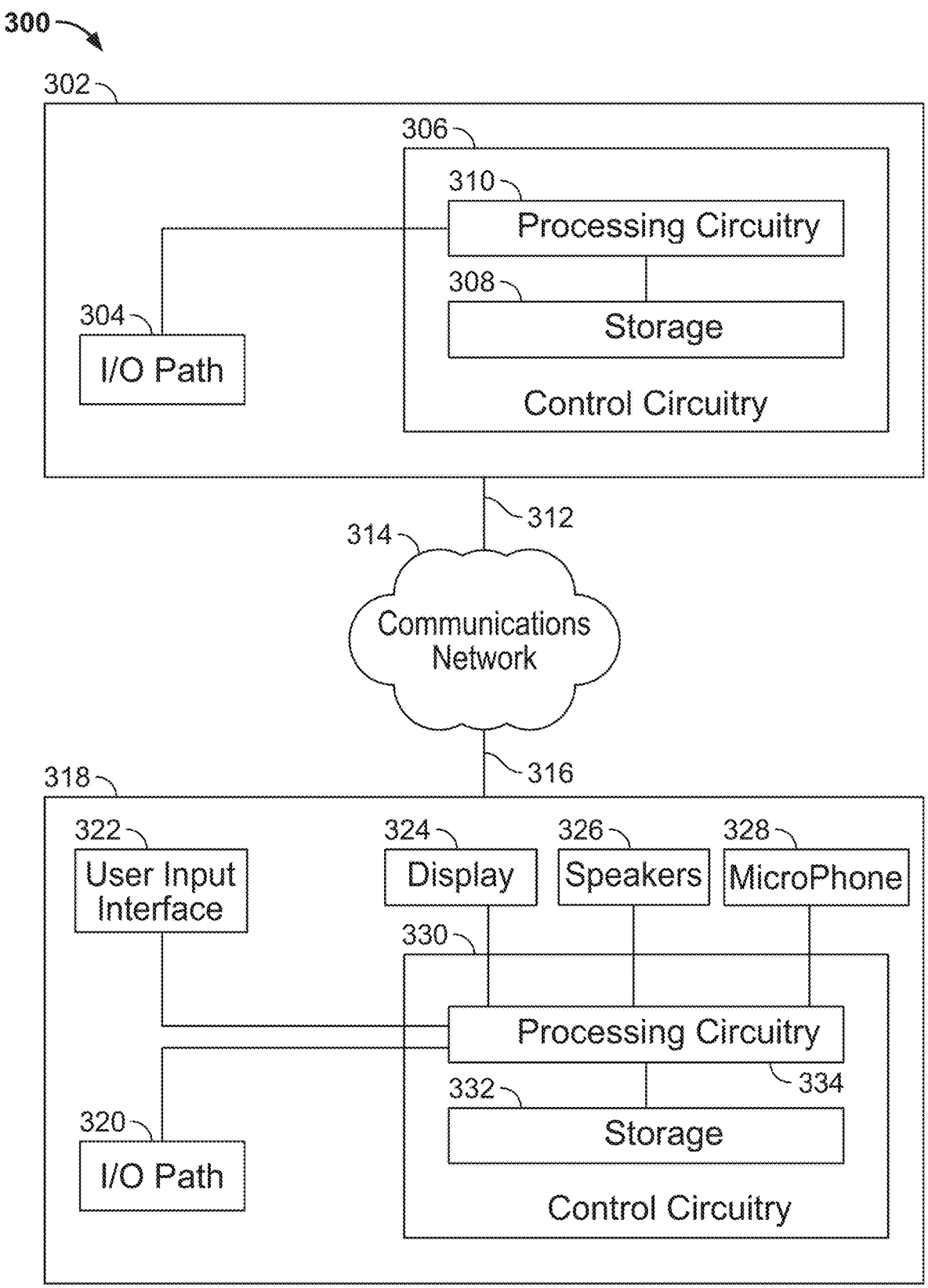
FIG. 3 shows a block diagram of an illustrative system, in accordance with some embodiments of the disclosure.
Figure 4:
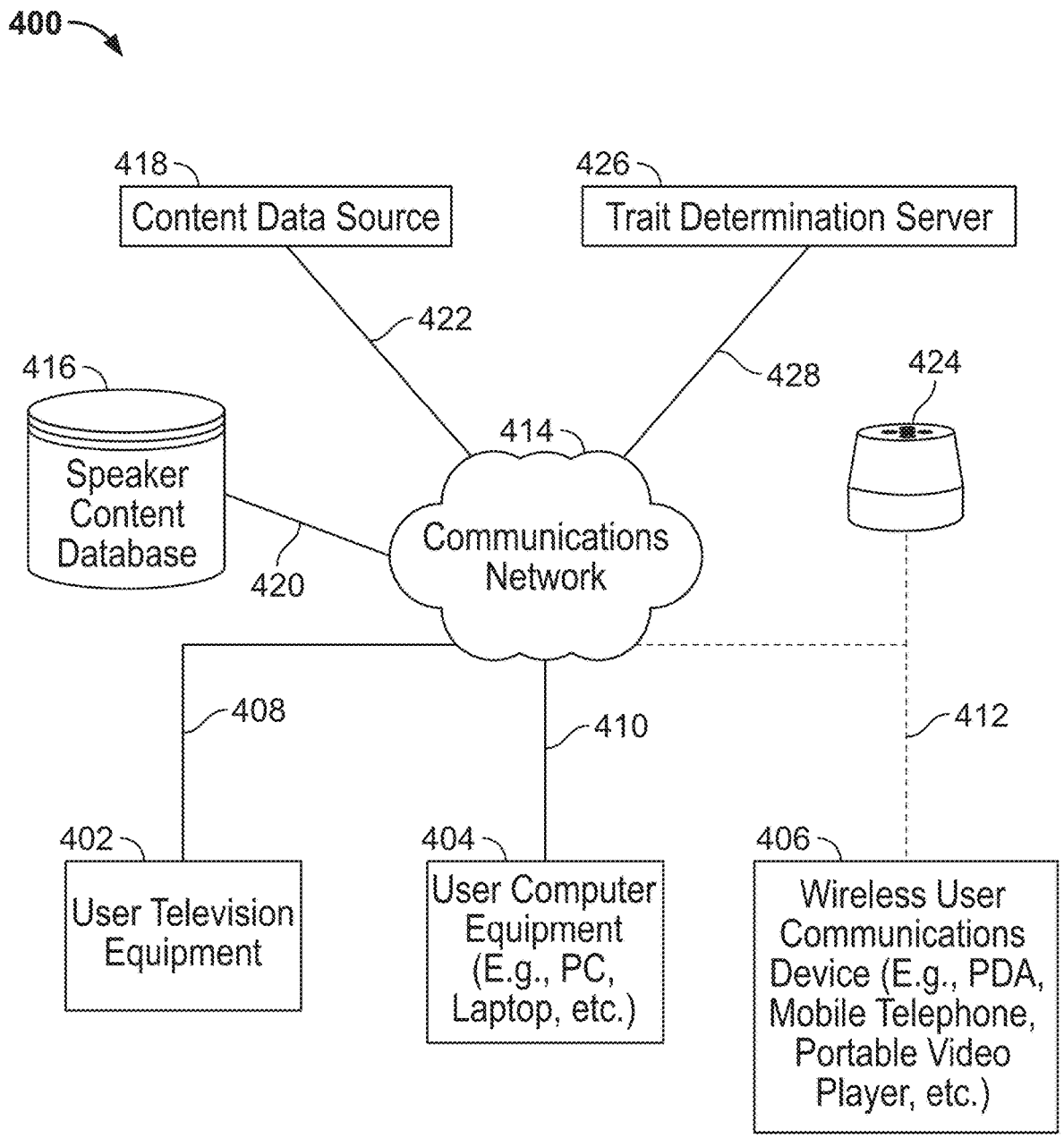
FIG. 4 depicts a block, diagram of an illustrative system, in accordance with some embodiments of the disclosure.

FIGS. 3-4 describe exemplary devices, systems, servers, and related hardware for determining trait(s) based on voice analysis to provide content item to the speaker. FIG. 3 shows a generalized embodiment of illustrative server 302 connected with illustrative remote user equipment device 318. More specific implementation of the devices is discussed below in connection with FIG. 3.

System 300 is depicted having server 302 connected with remote user equipment 318 (e.g., a user's digital voice assistant or a user's smartphone) via communications network 314. For convenience, because the system 300 is described from the perspective of the server 302, the remote user equipment 318 is described as being remote (i.e., with respect to the server 302). The remote user equipment 318 may be connected to the communications network 314 via a wired or wireless connection and may receive content and data via input/output (hereinafter "I/O") path 320. The server 302 may be connected to the communications network 314 via a wired or wireless connection and may receive content and data via I/O path 304. The I/O path 304 and/or the I/O path 320 may provide content (e.g., broadcast programming, on-demand programming, Internet content, and other video, audio, or information) and data to remote control circuitry 330 and/or control circuitry 324, which includes remote processing circuitry 334 and storage 332, and/or processing circuitry 310 and storage 308. The remote-control circuitry 330 may be used to send and receive commands, requests, and other suitable data using the I/O path 320. The I/O path 320 may connect the remote-control circuitry 330 (and specifically remote processing circuitry 334) to one or more communications paths (described below). Likewise, the control circuitry 306 may be used to send and receive commands, requests, and other suitable data using the I/O path 304. I/O functions may be provided by one or more of these communications paths but are shown as a single path in FIG. 3 to avoid overcomplicating the drawing.

The remote-control circuitry 330 and the control circuitry 306 may be based on any suitable remote processing circuitry such as processing circuitry based on one or more microprocessors, microcontrollers, digital signal processors, programmable logic devices, etc. In some embodiments, the control circuitry 306 executes instructions for a voice processing application, natural language processing application, and a trait determination application stored in memory (i.e., the storage 308). In client-server-based embodiments, the control circuitry 306 may include communications circuitry suitable for communicating with remote user equipment (e.g., the remote user equipment 318) or other networks or servers. For example, the trait determination application may include a first application on the server 302 and may communicate via the I/O path 312 over the communications network 314 to the remote user equipment 318 associated with a second application of the trait determination application. Additionally, the other ones of the voice processing, natural language processing may be stored in the remote storage 332. In some embodiments, the remote-control circuitry, the remote-control circuitry 330 may execute the voice processing application to bypass a train prediction engine and retrieve a trait associated with voice query from a speaker to provide content based on the retrieved trait to the speaker. In other embodiments, the remote-control circuitry 330 may execute the trait determination application to bypass a train prediction engine and retrieve a trait associated with voice query from a speaker to provide content based on the retrieved trait to the server 302. The trait determination application (or any of the other applications) may coordinate communication over communications circuitry between the first application on the server and the second application on the remote user equipment. Communications circuitry may include a modem or other circuitry for connecting to a wired or wireless local or remote communications network. Such communications may involve the Internet or any other suitable communications networks or paths (which is described in more detail in connection with FIG. 4). In addition, communications circuitry may include circuitry that enables peer-to-peer communication of user equipment devices (e.g., WIFI-direct, Bluetooth, etc.), or communication of user equipment devices in locations remote from each other.

Memory (e.g., random-access memory, read-only memory, or any other suitable memory), hard drives, optical drives, or any other suitable fixed or removable storage devices may be provided as the remote storage 332 and/or the storage 308. The remote storage 332 and/or the storage 308 may include one or more of the above types of storage devices. The remote storage 332 and/or storage 308 may be used to store various types of content described herein and voice processing application data, natural language processing data, Trait determination application data including content such as speaker profile including speaker ID, hash, traits (age, gender, ethnicity etc.) or other data used in operating the voice processing application, natural language processing application and trait determination application. Nonvolatile memory may also be used (e.g., to launch a boot-up routine and other instructions). Although the applications are described as being stored in the storage 306 and/or the remote storage 332, the applications may include additional hardware or software that may not be included in storages 308 and 332.

A speaker may control the remote-control circuitry 330 using user input interface 322. The user input interface 322 may be any suitable user interface, such as a remote control, mouse, trackball, keypad, keyboard, touch screen, touch pad, stylus input, joystick, microphone, voice recognition interface, or other user input interfaces. Display 324 may be provided as a stand-alone device or integrated with other elements of the remote user equipment 318. The display 312 may be one or more of a monitor, a television, a liquid crystal display (LCD) for a mobile device, or any other suitable equipment for displaying visual images. Speakers 314 may be provided as integrated with other elements of the remote user equipment 318 or may be stand-alone units.

The voice processing application, natural language processing application, and a trait determination application may be implemented using any suitable architecture. For example, they may be a stand-alone application wholly implemented on the server 302. In other embodiments, some of the application may be client-server-based application. For example, the voice processing application may be a client-server-based application. Data for use by a thick or thin client implemented on remote user equipment 318 may be retrieved on-demand by issuing requests to a server (e.g., the server 302) remote to the user equipment. In other embodiments, the server may be omitted, and the application may be implemented on the remote user equipment.

In some embodiments, as described above, the voice processing application, natural language processing application, and a trait determination application may be implemented on the server 302. In this example, the remote user equipment 318 simply provides captured audio of a voice query to the server 302. However, this is only an example, and in other embodiments the applications may be implemented on a plurality of devices (e.g., the remote user equipment 318 and the server 302) to execute the features and functionalities of the applications. The applications may be configured such that features that require processing capabilities beyond the remote user equipment 318 are performed on the server 302 server while other capabilities of the applications are performed on remote user equipment 332.

Though exemplary system 300 is depicted having two devices implementing the voice processing application, natural language processing application, and a personalized content application, any number of devices may be used.

System 300 of FIG. 3 can be implemented in system 400 of FIG. 4 as user television equipment 402, user computer equipment 404, wireless user communications device 405, voice assistant device 424, or any other type of user equipment suitable for interfacing with the voice processing application, natural language processing application and personalized content application. For simplicity, these devices may be referred to herein collectively as user equipment or user equipment devices. User equipment devices, on which an application is at least partially implemented, may function as a standalone device or may be part of a network of devices (e.g., each device may comprise an individual module of the personalized content application). Various network configurations of devices may be implemented and are discussed in more detail below.

User television equipment 402 may include a set-top box, an integrated receiver decoder (IRD) for handling satellite television, a television set, a digital storage device, a DVD recorder, a local server, or other user television equipment. One or more of these devices may be integrated to be a single device, if desired. User computer equipment 404 may include a PC, a laptop, a tablet, a personal computer television (PC/TV), a PC server, a PC center, or other user computer equipment. Wireless user communications device 406 may include a mobile telephone, a portable video player, a portable music player, a portable gaming machine, a wireless remote control, or other wireless devices. Voice assistant device 424 may include a smart speaker, a stand-alone voice assistant, smarthome hub, etc.

It should be noted that the lines have become blurred when trying to classify a device as one of the above devices. In fact, each of user television equipment 402, user computer equipment 404, wireless user communications device 406, voice control device 424, and IOT device 428 may utilize at least some of the system features described above in connection with FIG. 3 and, as a result, include some or all of the features of the voice processing application, natural language processing application and trait determination application described herein. For example, user television equipment 402 may implement a voice processing application that is activated upon detecting a voice input comprising a keyword. The voice processing application may also have the same layout on the various different types of user equipment or may be tailored to the display capabilities of the user equipment. For example, on user computer equipment 406, the voice processing application may be provided in a visual layout where the voice processing application may recite audio prompts of the voice processing application. In another example, the voice processing application may be scaled down for wireless user communications devices. In another example, the voice processing application may not provide a GUI and may listen to and dictate audio to a user such as voice assistant device 424, which in some instances, may not comprise a display.

In system 300, there is typically more than one of each type of user equipment device but only one of each is shown in FIG. 4 to avoid overcomplicating the drawing. In addition, each speaker may utilize more than one type of user equipment device (e.g., a speaker may have a television set and a computer) and also more than one of each type of user equipment device (e.g., a speaker may have a digital voice assistant device and a mobile telephone and/or multiple IOT devices).

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., iPhone) network, cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths but are shown as single paths in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, wireless paths (e.g., Bluetooth, infrared, IEEE 902-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes Speaker content database (e.g., table structure of Speaker Profile 150 of FIG. 1) 416, content data source (e.g., "Funny Movie" of FIG. 1) 418, and trait determination processing server 426 coupled to communications network 414 via communication paths 420, 422, and 428, respectively. Paths 420, 422, 428 may include any of the communication paths described above in connection with paths 408, 410, and 412. Communications with the speaker content database (database) 416 and content data source (source) 418 may be exchanged over one or more communications paths but are shown as a single path in FIG. 4 to avoid overcomplicating the drawing. In addition, there may be more than one of each of database 416 and source 418, but only one of each is shown in FIG. 4 to avoid overcomplicating the drawing. If desired, speaker content database 416 and source 418 may be integrated as one device. Although communications between the database 416 and the source 418 with user equipment devices 402, 404, 406, 424, and 428 are shown as through communications network 414, in some embodiments, the database 416 and the source 418 may communicate directly with user equipment devices 402, 404, 406, 424, and 428 via communication paths (not shown) such as those described above in connection with paths 408, 410, and 412.

Database 416 may store or index a plurality of speaker profile data (e.g., speaker ID, hash, traits such as age, gender, ethnicity etc.) of the speaker used for bypassing the trait prediction engine, retrieving the trait based on voice query and providing the content based on the retrieved trait. In some embodiments, database 416 may index the location of the speaker profile data located on servers located remotely or local to database 416. In some embodiments, in response to identification of the speaker, the trait determination application may access the index stored on database 416 and may identify a server (e.g., a database stored on a server) comprising the trait of the identified speaker. For example, the trait determination application may receive a voice query requesting a content item and determine that voice query matches a speaker ID stored in the speaker profile in the database 416 within a confidence threshold. The trait determination application bypasses the trait prediction engine, retrieves trait corresponding to the matched speaker ID from the database 416 and provides a first content item from the content data source 418. In another example, the trait determination application may receive a voice query requesting a content item and determine that voice query does not match any speaker ID stored in the speaker profile in the database 416 within the confidence threshold. The trait determination application may create a new entry in speaker profile in the database 416 for the unmatched voice query and invoke the trait prediction engine to determine trait of the unmatched voice query. In a further example, the trait determination application may receive a voice query requesting a content item and determine that voice query that matched the speaker ID stored in the speaker profile in the database 416 within the confidence threshold has a score greater than the confidence threshold. The trait determination application updates the trait stored in the database 416 corresponding to the matched speaker ID.

Source 418 may provide data used during the operation or function of the personalized content application. For example, source may store content items and functions associated with the personalized content application, etc. In some embodiments, updates for the trait determination application may be downloaded via source 418.

The trait determination application may be, for example, a stand-alone application implemented on user equipment devices. In other embodiments, trait determination application may be a client-server application where only the client resides on the user equipment device. For example, the trait determination application may be implemented partially as a client application on control circuitry 304 of devices 402, 404, 406, 424, and/or 428 and partially on a remote server as a server application (e.g., source 418, database 416, or server 426). The guidance application displays and/or voice control application displays may be generated by the source 418, database 416, trait determination processing server 426 and transmitted to the user equipment devices. The source 418, database 416, and trait determination processing server 426 may also transmit data for storage on the user equipment, which then generates the voice control application displays and audio based on instructions processed by control circuitry.

System 400 is intended to illustrate a number of approaches, or configurations, by which user equipment devices and sources and servers may communicate with each other. The present invention may be applied in any one or a subset of these approaches, or in a system employing other approaches for delivering and providing a voice control application.

Figure 5:
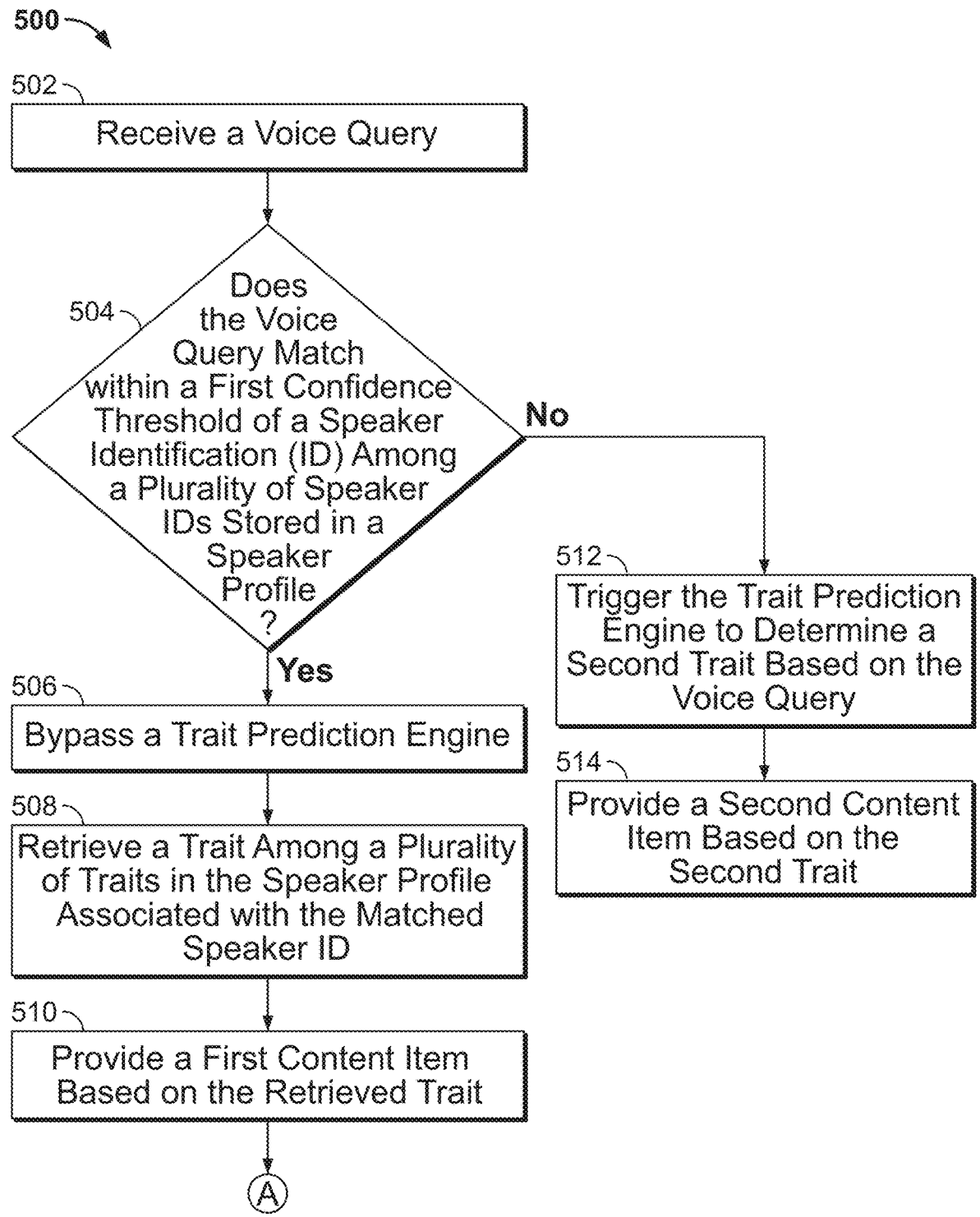
FIG. 5 depicts a flowchart of illustrative steps for determining trait(s) based on voice analysis and providing content item based on the determined trait(s), in accordance with some embodiments of the disclosure.

FIG. 5 is a flowchart of an illustrative process 500 for determining a trait based on voice analysis to present content to the speaker, in accordance with some embodiments of the disclosure. In some embodiments, each step of the process 500 can be performed by server 302 (e.g., via control circuitry 306) or by remote user equipment device 318 (e.g., via control circuitry 330) in FIG. 3.

Process 500 begins at block 502, where the control circuitry receives a voice query. In one example, the voice query is a voice query 104, (e.g., "Play Funny Movie") as illustrated in FIG. 1. At block 504, control circuitry determines whether the voice query matches within a first confidence threshold of a speaker identification (ID) among a plurality of speaker IDs stored in a speaker profile. In one embodiment, a biometric fingerprint or hash is generated from a voice query (e.g., 104 in FIG. 1) and compared with the hashes (e.g., 154 in FIG. 1) in a speaker profile (e.g., 150 in FIG. 1). In one example, the speaker profile contains profile data (speaker ID, corresponding hash and trait(s)) of all members of the household. In one embodiment, the first confidence threshold is pre-determined based on the voice previously captured from the voice query. The first confidence threshold is used as a standard to analyze voice quality of the voice captured in real time. In one example, the first confidence threshold is in the range of 70 percent to 80 percent. When, at block 504, it is determined that the voice query matches within the first confidence threshold of a speaker identification (ID) among the plurality of speaker IDs, then at block 506, the control circuitry bypasses a trait prediction engine. In one example, the generated match matches with Hash 1 within the range of 70 percent to 80 percent. At block 508, the control circuitry retrieves a trait among a plurality of traits in the speaker profile associated with the matched speaker ID. In one example, the matched speaker ID is Speaker ID 1 and the corresponding traits are an English male in the age range of 40-45 years as illustrated in the speaker profile 150 in FIG. 1. At block 510, the control circuitry provides a first content item based on the retrieved trait. In one example, the first content item (e.g., "Funny Movie" in FIG. 1) is displayed.

Returning back to block 504, when it is determined that the voice query does not match within the first confidence threshold of a speaker identification (ID) among the plurality of speaker IDs, then at block 512, the control circuitry triggers the trait prediction engine to determine a second trait based on the voice query. In one embodiment, it is determined that the speaker profile data is not in the speaker profile (e.g., 150 in FIG. 1). In one example, the speaker is not a member of the household. In some embodiments, a new entry is created in the speaker profile. In one embodiment, a biometric fingerprint or hash generated from the voice query is utilized by the trait prediction engine to determine a trait of the speaker. In one embodiment, the biometric fingerprint or hash generated from the voice query is utilized by the ID prediction engine to create a speaker ID of the voice query. In one example, the new entry includes the speaker ID as unknown speaker, the hash as hash 5 and predicted traits as illustrated in FIG. 1. In one embodiment, the new entry is added into the speaker profile.

Figure 6:
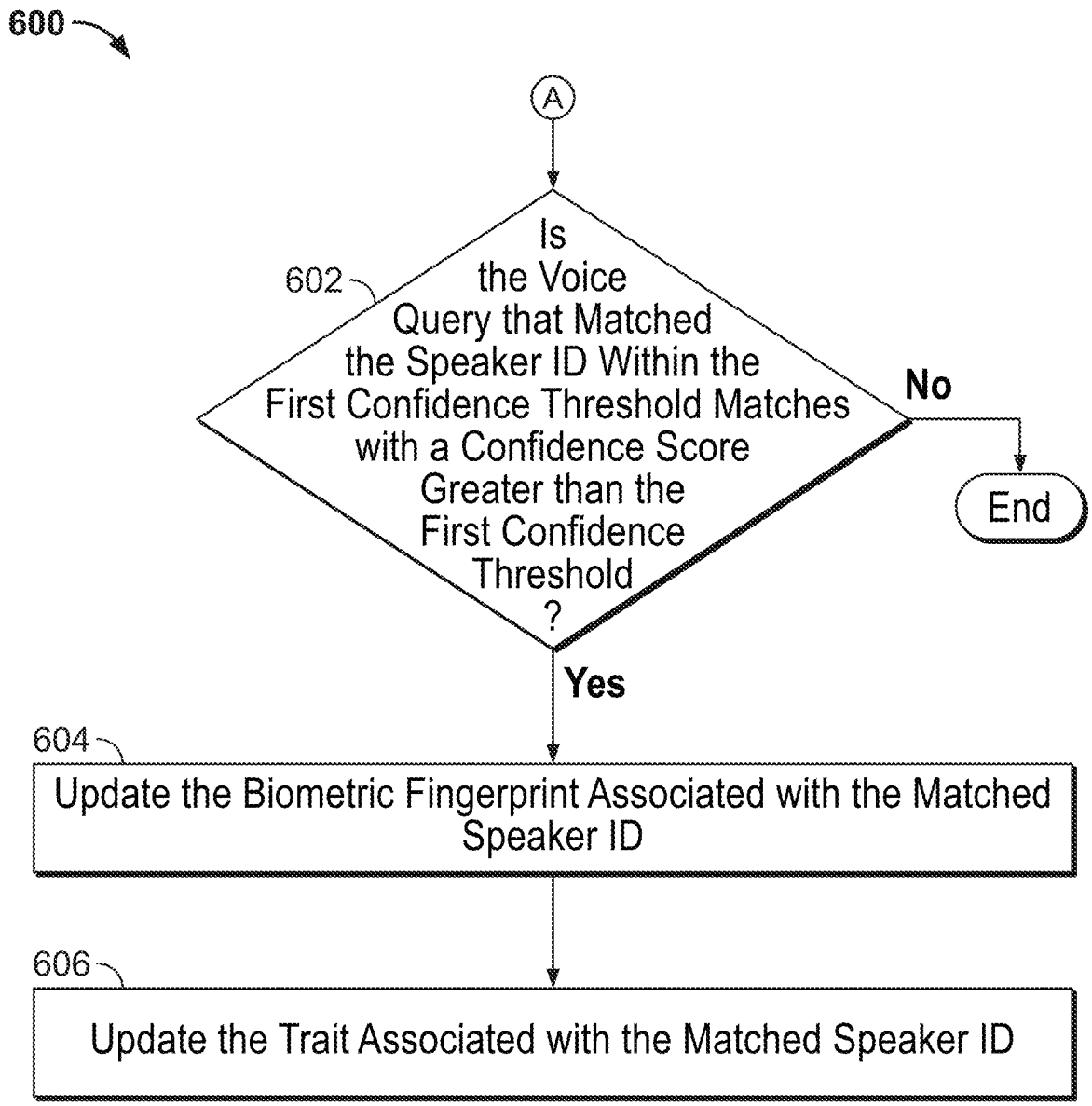
FIG. 6 depicts a flowchart of illustrative steps for updating trait(s) based on voice analysis, in accordance with some embodiments of the disclosure.

FIG. 6 is a flowchart of an illustrative process 600 for updating the trait in the speaker profile based on voice analysis, in accordance with some embodiments of the disclosure. In some embodiments, each step of the process 600 can be performed by server 302 (e.g., via control circuitry 306) or by remote user equipment device 318 (e.g., via control circuitry 330) in FIG. 3.

Process 600 begins at block 602, where the control circuitry determines whether the voice query that matched the speaker ID within the first confidence threshold matches with a confidence score greater than the first confidence threshold. As discussed above, in one embodiment, the first confidence threshold is pre-determined based on the voice previously captured from the voice query. The first confidence threshold is used as a standard to analyze voice quality of the voice captured in real time. In one example, the first confidence threshold is in the range of 70 percent to 80 percent. When, at block 602, it is determined that the voice query matched the speaker ID within the first confidence threshold matches with the confidence score greater than the first confidence threshold, then at block 604, the control circuitry updates the biometric fingerprint associated with the matched speaker ID. In one example, it is determined whether the generated hash that matched with Hash 1 (FIG. 1) was matched with 90 percent score, which is higher than the range of 70 percent to 80 percent of the first confidence threshold. Thus, biometric fingerprint of the voice captured from the voice query is determined to be of a higher quality. In one example, it is determined from the biometric fingerprint of the higher quality that the ethnicity is Hispanic. At block 606, the control circuitry updates the trait associated with the matched speaker ID. In one example, the ethnicity of English of Speaker ID 1 is replaced with Hispanic in the speaker profile (e.g., 150 in FIG. 1). In one embodiment, the control circuitry determines a trait to be updated based on a trait threshold. As discussed above, the trait threshold is pre-determined based on the trait previously determined from the voice query. The trait threshold is used as a standard to analyze accuracy of the trait determined from the voice query captured in real time. In one example, the trait is the age range and the trait threshold is an age range of 40-50 years. For example, it is determined from the biometric fingerprint of the higher quality that the age range is 51-55 years, which does not fall within the trait threshold. In one example, the age range of 40-45 years of Speaker ID 1 is replaced with 51-55 years in the speaker profile 150 (e.g., 150 in FIG. 1). In another example, both the ethnicity of English of Speaker ID 1 is replaced with Hispanic and the age range of 40-45 years of Speaker ID 1 is replaced with 50-55 years in the speaker profile 150 (e.g., 150 in FIG. 1).

It is contemplated that the steps or descriptions FIGS. 5-6 may be used with any other embodiment of this disclosure. In addition, the descriptions described in relation to the algorithms of FIGS. 5-6 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 5-6 may be implemented on a combination of appropriately configured software and hardware, and that any of the devices or equipment discussed in relation to FIGS. 1-4 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:
1. A method comprising:
receiving a voice query;
generating a biometric fingerprint of the voice query;
comparing the generated biometric fingerprint with a plurality of biometric fingerprints stored within a profile of a user;
determining whether a match exists between the generated biometric fingerprint and one of the plurality of biometric fingerprints stored within the profile of the user, wherein the match is associated with a confidence score;

in response to determining that the confidence score associated with the match is above a first confidence threshold, retrieving a trait stored in the profile of the user that is associated with the matched biometric fingerprint of the plurality of biometric fingerprints; and in response to determining that the confidence score associated with the match is below the first confidence threshold and above a second confidence threshold:
- determining a trait corresponding to the generated biometric fingerprint; and
- updating the plurality of biometric fingerprints stored within the profile of the user with the determined trait corresponding to the generated biometric fingerprint.

2. The method of claim 1, wherein the biometric fingerprint represents at least one of a tone, a pitch or a pace of a voice of the user.

3. The method of claim 1, wherein the profile of the user is a database.

4. The method of claim 3, wherein each of the plurality of biometric fingerprints stored within the database is associated with a unique speaker identification (ID) respectively.

5. The method of claim 1, wherein determining whether the match exists comprises:
- comparing the traits associated with the generated biometric fingerprint with the traits associated with each of the plurality of biometric fingerprints stored within the profile of the user respectively; and
- generating the confidence score based on a correlation between the compared traits.

6. The method of claim 1, wherein the first confidence threshold is pre-determined based on speech features previously captured from the voice query.

7. The method of claim 1, wherein retrieving the trait stored in the profile of the user comprises:
- using a trait determination application to access a database containing the plurality of biometric fingerprints.

8. The method of claim 1, wherein the trait may be one of an age range, a gender or an ethnicity.

9. The method of claim 1, wherein updating the plurality of biometric fingerprints comprises:
- replacing the matched biometric fingerprint stored in the profile of the user with the biometric fingerprint generated from the voice query.

10. The method of claim 1, further comprising:
in response to determining that the confidence score associated with the match is below the second confidence threshold:
- triggering a trait determination application to determine a second trait based on the generated biometric fingerprint of the voice query; and
- updating the plurality of biometric fingerprints stored within the profile of the user with the second trait.

11. A system comprising:
a memory; and
control circuitry configured to:
- receive a voice query;
- generate a biometric fingerprint of the voice query;
- compare the generated biometric fingerprint with a plurality of biometric fingerprints stored within a profile of a user in the memory;
- determine whether a match exists between the generated biometric fingerprint and one of the plurality of biometric fingerprints stored within the profile of the user, wherein the match is associated with a confidence score;
- in response to determining that the confidence score associated with the match is above a first confidence threshold, retrieve a trait stored in the profile of the user that is associated with the matched biometric fingerprint of the plurality of biometric fingerprints; and
- in response to determining that the confidence score associated with the match is below the first confidence threshold and above a second confidence threshold:
  - determine a trait corresponding to the generated biometric fingerprint; and
  - update the plurality of biometric fingerprints stored within the profile of the user with the determined trait corresponding to the generated biometric fingerprint.

12. The system of claim 11, wherein the biometric fingerprint represents at least one of a tone, a pitch or a pace of a voice of the user.

13. The system of claim 11, wherein the profile of the user is a database.

14. The system of claim 13, wherein each of the plurality of biometric fingerprints stored within the database is associated with a unique speaker identification (ID) respectively.

15. The system of claim 11, wherein control circuitry is further configured to:
- compare the traits associated with the generated biometric fingerprint with the traits associated with each of the plurality of biometric fingerprints stored within the profile of the user respectively; and
- generate the confidence score based on a correlation between the compared traits.

16. The system of claim 11, wherein the first confidence threshold is pre-determined based on speech features previously captured from the voice query.

17. The system of claim 11, wherein control circuitry is further configured to:
- use a trait determination application to access a database containing the plurality of biometric fingerprints.

18. The system of claim 11, wherein the trait may be one of an age range, a gender or an ethnicity.

19. The system of claim 11, wherein control circuitry is further configured to:
- replace the matched biometric fingerprint stored in the profile of the user with the biometric fingerprint generated from the voice query.

20. The system of claim 11, wherein control circuitry is further configured to:
in response to determining that the confidence score associated with the match is below the second confidence threshold:
- trigger a trait determination application to determine a second trait based on the generated biometric fingerprint of the voice query; and
- update the plurality of biometric fingerprints stored within the profile of the user with the second trait.

* * * * *